Aug. 11, 1959   P. C. DRIVER   2,899,190
FORCE MEASURING APPARATUS
Filed Sept. 25, 1957   4 Sheets-Sheet 1

INVENTOR.
PAUL C. DRIVER
BY
ATTORNEYS

Aug. 11, 1959 P. C. DRIVER 2,899,190
FORCE MEASURING APPARATUS
Filed Sept. 25, 1957 4 Sheets-Sheet 2

INVENTOR.
PAUL C. DRIVER
BY
ATTORNEYS

Aug. 11, 1959 — P. C. DRIVER — 2,899,190
FORCE MEASURING APPARATUS
Filed Sept. 25, 1957 — 4 Sheets-Sheet 3

*INVENTOR.*
PAUL C. DRIVER
BY
ATTORNEYS

INVENTOR.
PAUL C. DRIVER
BY
ATTORNEYS

United States Patent Office 2,899,190
Patented Aug. 11, 1959

2,899,190

FORCE MEASURING APPARATUS

Paul C. Driver, China Lake, Calif.

Application September 25, 1957, Serial No. 686,265

17 Claims. (Cl. 264—1)

(Granted under Title 35, U.S. Code (1952), sec. 266)

The invention described herein may be manufactured and used by or for the Government of the United States of America for governmental purposes without the payment of any royalties thereon or therefor.

This invention relates generally to electro-mechanical devices and systems for precise measurement and control. More particularly it relates to a measuring apparatus of the type wherein a sensing member, experiencing an input force which may be variable, is associated with a radio-frequency oscillator to correspondingly affect the direct current taken thereby from a power source, the sensing member also being mechanically linked to force-feedback means which is energized by the oscillator current to apply an opposing force to the sensing element. Such an apparatus achieves continuous balance between the input force and the feedback force, and the energizing current supplied to the force-feedback means serves to identify the magnitude of the input force or of the particular parameter under measurement which gives rise to the input force.

This application is a continuation-in-part of patent application Serial No. 414,523 entitled "Accelerometer," filed March 5, 1954, by Paul C. Driver, now abandoned, which discloses a force measuring system of the general character briefly described above, presenting unexpected and outstanding improvements in sensitivity, accuracy and linearity as provided principally by use of a VHF (very high frequency) oscillator operating in a squegging or self-pulsing mode. This force-measuring system obviously is adapted to many uses, and is particularly well-suited for use in measurement of aircraft orientations and accelerations and correspondingly for automatic course plotting or missile guidance. The present application additionally concerns novel structure of the force measuring apparatus, further circuitry embodiments, and modifications which enlarge application of the device to measurement of angular acceleration forces.

Previously known force measuring systems of the general type described earlier above, heretofore employing various circuit arrangements characterized by the use of conventional continuously-running oscillators and operating at relatively low radio frequencies, exhibit comparatively poor transfer characteristics, thus requiring that their indicating or utilization devices be rather sensitive and rendering them unreliable and unsuited for aircraft use, otherwise requiring amplifiers or additional conversion equipment so that more rugged indicators or other utilization equipment may be employed. As described in the above-mentioned parent application and in accordance with the invention, it has been found that by proportioning the circuit constants of the force-measuring apparatus oscillator in such manner as to provide VHF operation, and more importantly by providing such an oscillator which operates in a squegging or self-pulsing mode rather than in a continuously running or C.W. (continuous-wave) mode, the force-measuring apparatus is improved to a remarkable degree, exhibiting unexpectedly high sensitivity and accuracy normally associated only with elaborate precision laboratory equipment, and making it possible to provide an accurate and reliable force measuring apparatus having the ruggedness and compactness necessary for airborne use.

In accordance with the foregoing, an object of the invention is to provide a force-measuring system having greatly improved operational characteristics as to dynamic range, sensitivity, accuracy and linearity.

It is another object of the present invention to provide an improved force-measuring apparatus particularly suited for airborne use and having improved characteristics of compactness, ruggedness and reliability.

It is a further object of the present invention to provide an improved force-measuring apparatus having adjustable means which renders the apparatus selectively usable as a linear accelerometer, or as an angular accelerometer immune to linear accelerations, and which further enables adjustment of measurement sensitivity when used as a linear accelerometer.

Other objects and many of the attendant advantages of this invention will be readily appreciated as the same becomes better understood by reference to the following detailed description when considered in connection with the accompanying drawings wherein.

Figure 7:
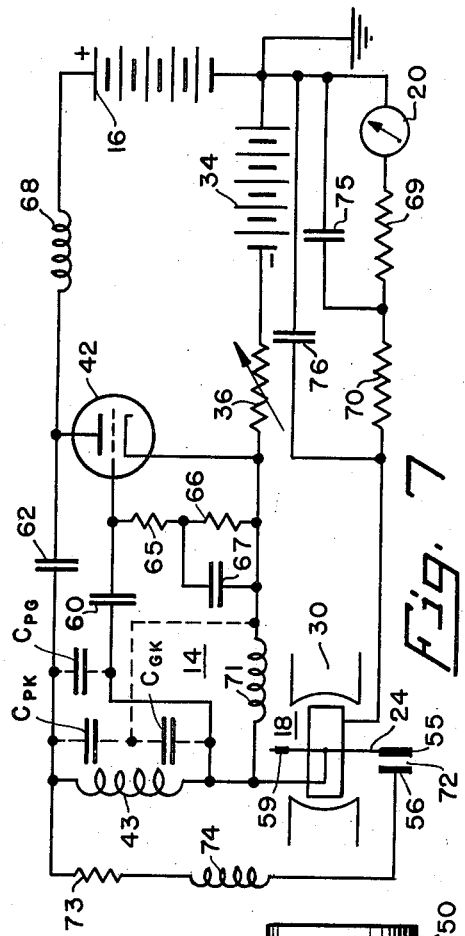
Fig. 7 is a schematic illustrating in detail typical circuitry of the invention shown in basic form in Fig. 2.
Figure 8:
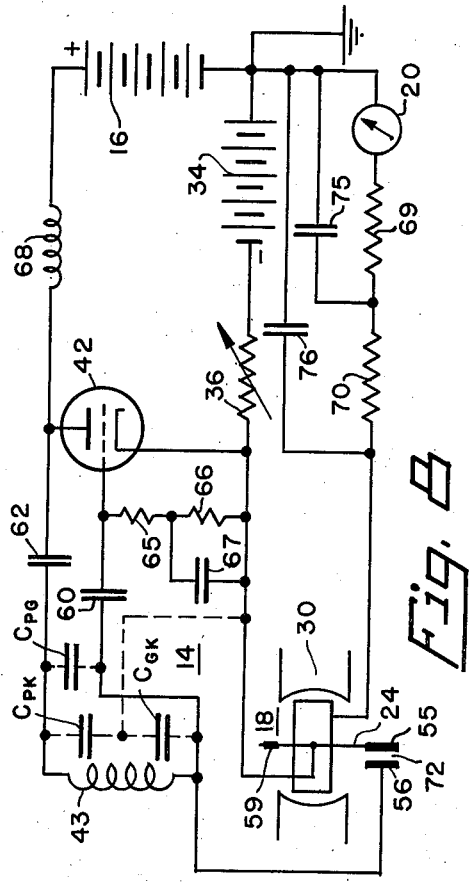
Figure 9:
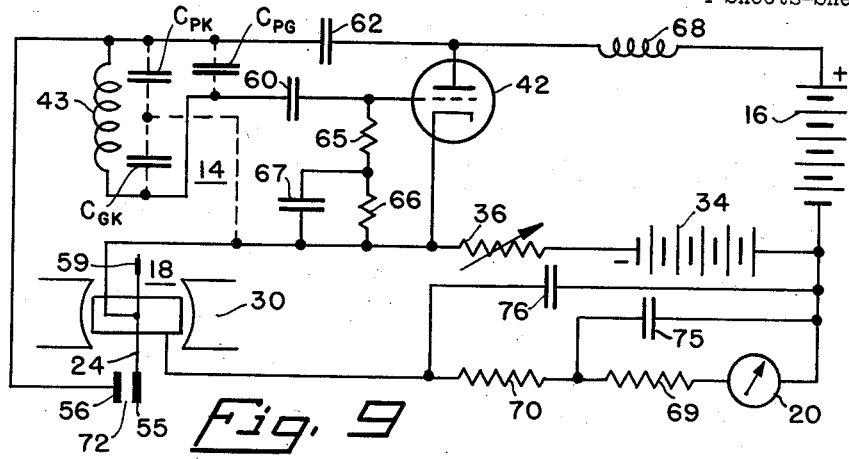
Figure 10:
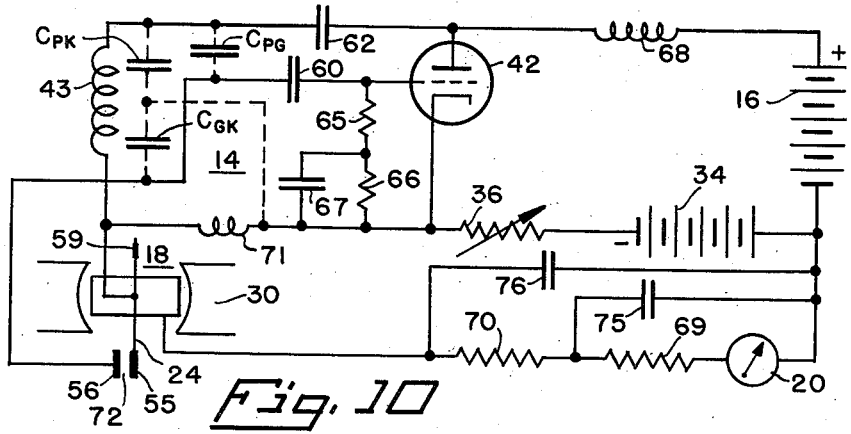

Figs. 8, 9 and 10 present variations of Fig. 7 circuitry; and

Figure 2:
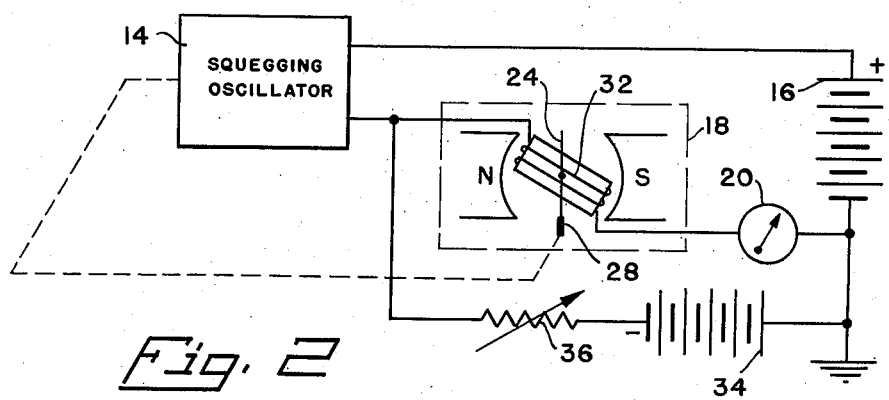
Fig. 2 illustrates schematically a preferred basic circuit arrangement, in accordance with the invention, which enables continuous measurement of accelerations or forces which may be variable both as to sense and magnitude.
Figure 11:
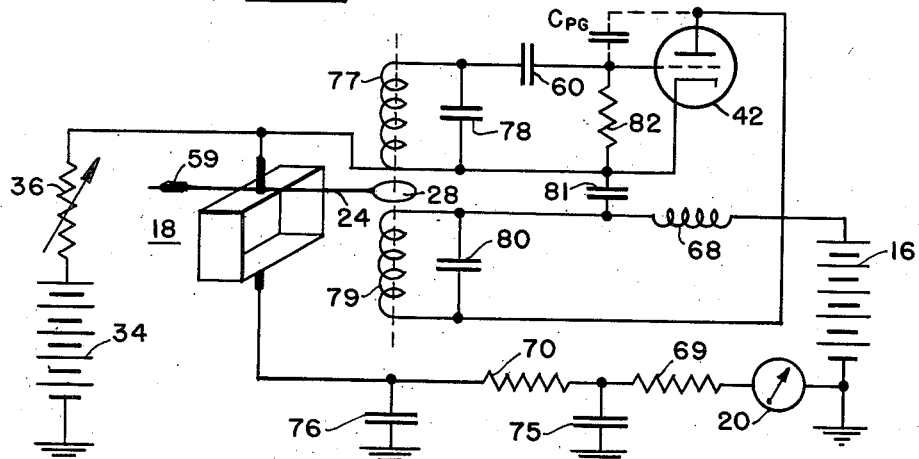

Fig. 11 illustrates schematically and in detail another circuit arrangement of the invention, still in accordance with the preferred basic form shown in Fig. 2.

Figure 1:
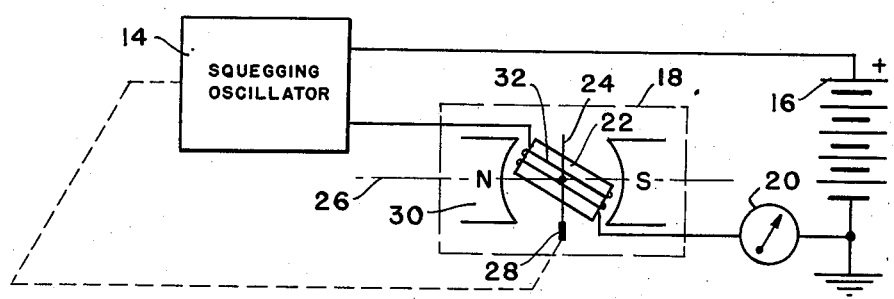
Fig. 1 illustrates schematically the salient components and basic circuitry of the force-measuring apparatus in accordance with the invention.
Figure 3:
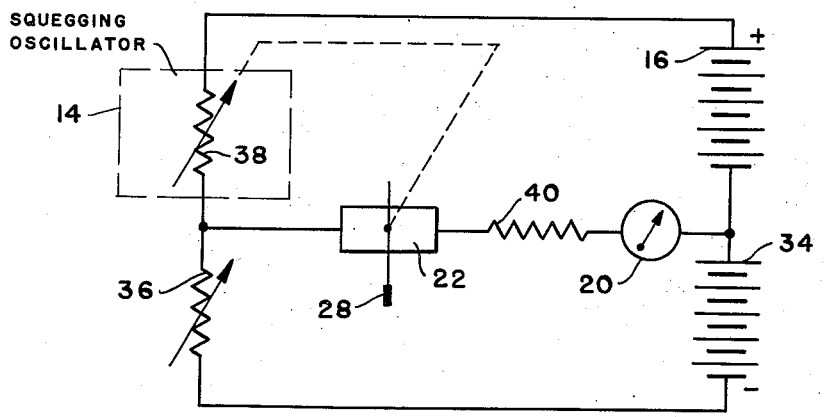
Fig. 3 is an explanatory diagram concerning operation of the Fig. 2 embodiment.

The invention as disclosed and described in the previously-mentioned parent application is here illustrated schematically in its basic form in Figs. 1, 2 and 3, certain salient elements thereof, such as the self-pulsing oscillator, radio-frequency loading means, and force-feedback devices such as the indicated d'Arsonval meter movement, being well known per se.

First referring to Fig. 1, oscillator 14 is preferably designed to operate at very high frequency, say at about 250 mc./s. (megacycles per second), and to oscillate intermittently by self-pulsing action at frequencies which, dependent upon the effective loading action to be described, may vary upwardly from say 5 kc./s. (kilocycles per second). It is this self-pulsing mode of operation which is responsible for the notable improvement in transfer characteristic of the force-measuring apparatus, and in other characteristics thereof such as accuracy, linearity and range of measurement. As utilized in the present force-measuring apparatus, the self-pulsing VHF oscillator 14 generates bursts of radio-frequency energy, which bursts or pulses may change in amplitude to some extent, and which occur at a pulse repetition rate varying under influence of the associated force-sensing member to be described. It has been found that this yields improvement in transfer characteristic of the complete apparatus, to a much greater extent, however, than can be attributed simply to the flow of plate-to-cathode current during each pulse of radio-frequency energy, the unexpected improvement presently appearing to stem from the circumstance that current flow also actually takes place in the oscillator plate-to-cathode D.C. circuit in the longer intervals between the radio-frequency pulses in a manner dependent upon the loading and the pulse rate. Thus, while self-pulsing oscillators are well-known per se, having been employed heretofore in some radar and radiosonde equipments but simply for generation of radio-frequency energy pulses, and the underlying theory of their operation in such applications being well-known, their use in force-measuring apparatus as here described gives rise to unexpected improvements which cannot be predicted from previously known theory of self-pulsing oscillator operation.

Referring again to Fig. 1, the unidirectional current taken by self-pulsing high-frequency oscillator 14 from supply source 16 energizes a force feedback device, here shown as a d'Arsonval type meter movement 18. The d'Arsonval movement is in effect energized by the smoothed or average value of the current, hereinafter termed the force feedback current, in this instance indicated by meter 20. Secured to bobbin 22 of the d'Arsonval movement, or more conveniently to one of the pivots thereof which conventionally are secured to the bobbin structure, is an arm 24 which is adapted to unbalance the bobbin structure to a predetermined extent so that it may be deflected, from a normal or quiescent orientation, by ecceleration forces experienced along a sensitive axis 26 extending orthogonally to the plane defined by arm 24 and the pivotal axis of bibbin 22. A plate or vane 28 at the outer end of arm 24 is associated with oscillator 14, as here shown schematically and later detailed, in such manner that angular displacement of bobbin 22, due to linear acceleration in a predetermined direction along the sensitive axis 26, increases the averaged value of the current drawn by oscillator 14 from source 16. The electro-magnetic relationship of the field pole structure 30 and of bobbin coil 32, of course, are such that the effective force imposed upon bobbin 22, as a result of force feedback current through bobbin coil 32, is in a direction to oppose the acceleration force experienced by the unbalanced bobbin, the system therefore automatically and nearly instantaneously adjusting itself to a state of force balance, and the value of the force feedback current as indicated by member 20 being a measure of that component of acceleration lying along the sensitive axis.

While the use of a self-pulsed oscillator in a force-measuring apparatus as above described provides significant improvement in transfer and other characteristics, the further development illustrated in Fig. 2 renders the apparatus capable of continuously measuring accelerations of either positive or negative sense and which may range down to or through zero value. The circuitry shown in Fig. 2 is based upon that already described with reference to Fig. 1, having in addition a biasing circuit comprising supply source 34 and series resistor 36, connected across the indicating meter 20 and bobbin coil 32 of the force feedback device, and arranged to provide an opposing current to bobbin coil 32. This is represented in Wheatstone bridge configuration in the explanatory diagram given in Fig. 3, wherein oscillator 14 is represented simply as a variable resistor 38, since this is the effect of oscillator control by van 28. Resistor 40 represents the lumped value of the internal or effective meter resistance and other resistances in that branch of the circuit.

While it might first appear that the voltage of source 34 and the ohmic value of resistor 36 are critical as to providing a zero reading of meter 20, such zero reading is in fact dependent only upon the quiescent condition of the apparatus because of the self-balancing action of the system. The selection of source 34 voltage value and the ohmic value of resistor 36 are of importance, however, in establishing the relative limits of positive and negative acceleration measurement ranges, and optimum response.

Figure 4:
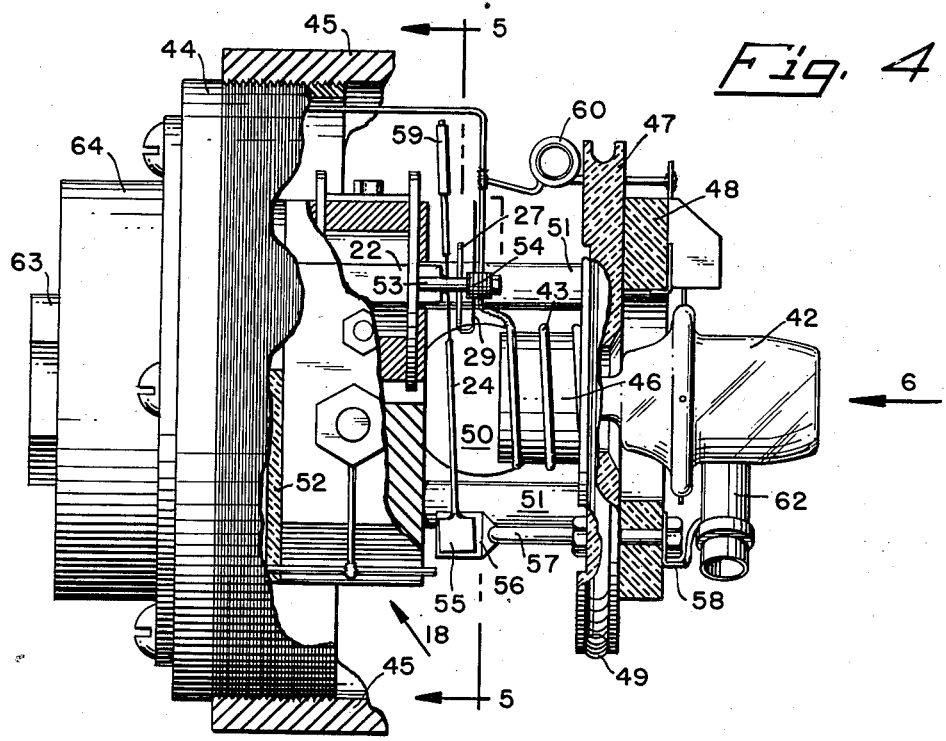
Fig. 4 is a side elevation view of a structural embodiment of the complete apparatus, exclusive of power supply, partly in section and with parts broken away to clarify the structure.
Figure 5:
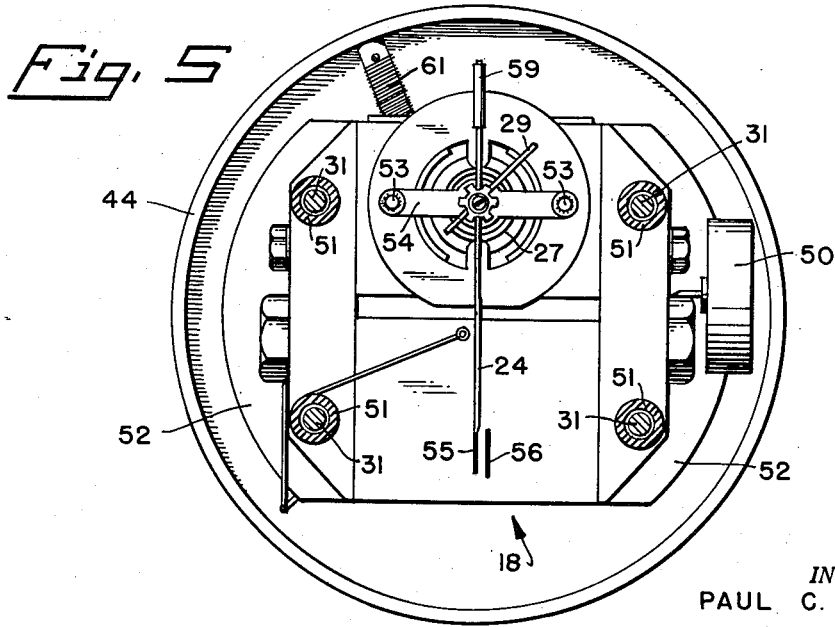
Fig. 5 is a face view principally of the modified d'Arsonval movement forming a part of the Fig. 4 structure, taken along the line 5—5 of Fig. 4.
Figure 6:
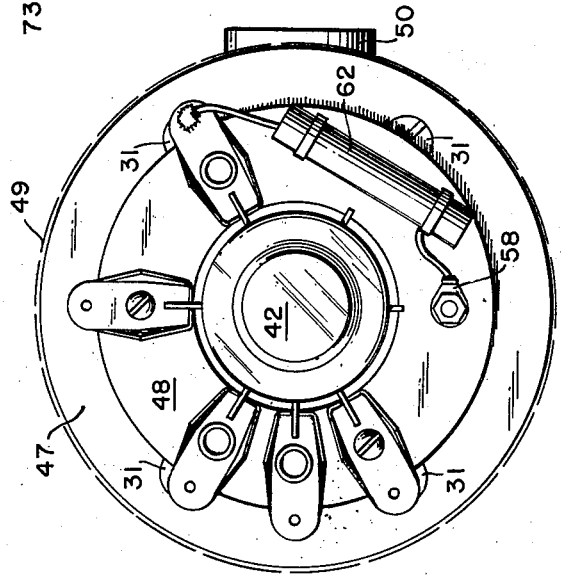
Fig. 6 is a face view of the Fig. 4 structure, uncased and taken in the direction of arrow 6 in Fig. 4.

A typical physical embodiment of the force-measuring apparatus, exclusive of power supply, is illustrated in Figs. 4, 5 and 6, and it may be noted at this point that while the force-measuring system has thus far been described in terms of its application as a linear accelerometer, the structure here shown includes means for rendering it capable of also functioning as an angular accelerometer, unaffected by linear accelerations. Referring more particularly to Fig. 4 which illustrates the structure partly in section and with parts broken away for clarity, the d'Arsonval movement 18 and the oscillator comprising tube 42 and coil 43 are aligned in adjacent and substantially axial relationship, and are supported within a shielding enclosure formed by cupped base 44 and threadedly engaged cylindrical casing 45, here shown fragmentarily. Tube 42 preferably is a triode suited for UHF operation, here shown as being of acorn type, so termed because of its shape. Its electrode leads are brought out through a beaded or flanged portion of the tube, there being no base as such, and certain unused leads of the tube in this instance being clipper short to eliminate interference with circuit components mounted adjacent thereto. Coil 43 is wound on a low-loss specially designed coil form 46 having an integral flange member 47 to which is secured, by any suitable means, a supporting socket 48 for tube 42. The peripheral portion of flange member 47 is grooved to accept a heating element 49 which operates in conjunction with thermostat 50, being connected therewith and to an external supply source in conventional manner and therefore not detailed here, to insure that the temperature within the shielding enclosure does not fall below a predetermined threshold value, say normal room temperature, when the apparatus is employed in low-temperature environment. Coil form 46 is supported in spaced relationship to d'Arsonval movement 18 by means of several standoff members 51 through which extend fastening bolts, not shown. The d'Arsonal movement 18 is secured to an insulating plate member 52 having a cutaway portion to accommodate the lower spring and pivot bearing structure (not shown) of the d'Arsonval movement, plate member 52 in turn being rigidly mounted upon cupped base 44, as by means of a centrally positioned bolting and spacing member (not shown), thus providing space between the base and plate member principally to accommodate VHF chokes and wiring. The d'Arsonval movement may be of usual structure except as modified to provide an arm or sensing member 24 mounted upon bobbin 22, and in some instances as to replacement of the coiled hairsprings which exert a balancing torque while providing conductive links through the pivots to the bobbin winding and also to the arm or sensing member 24. A conventional 150 micro-ampere d'Arsonval movement has been found very satisfactory, for use in this force-measuring apparatus, as to basic sensitivity and current range, which may of course be modified by a calibrated Ayrton or other conventional shunting arrangement (not shown).

Sensing member 24 may be secured to the bobbin 22 in the conventional manner employed for the usual indicating pointer, namely by mounting it upon the bobbin pivot structure, here hidden from view by one of the posts 53 which support the bearing bracket 54. One end of sensing member 24 carries a vane 55 here designed to serve as a movable capacitor plate, having rather small face area which in this instance is approximately 0.015 square inch. A confronting capacitor plate 56 is carried by stem 57 which extends through flange 47 and socket 48, being secured thereto as shown and connection thereto being made via terminal 58 on tube socket 48. Sensing member 24 carries at its opposite end a ferrule 59 which by threaded engagement or simply frictional engagement may be adjusted to alter the degree of unbalance of the bobbin and sensing member structure, whereby to conveniently adjust the basic sensitivity of the apparatus. Ferrule 59 may further be so adjusted as to provide an exact balance of the bobbin and sensing member structure, adapting the described apparatus to measurement of angular accelerations without change in circuitry. The developed torque in this instance results from the angular acceleration and the moment of inertia of the assembly, and is balanced by action of the force feed-back current as before.

The particular force-balance type of measuring apparatus here described captures or constrains the bobbin and sensing member, maintaining the position thereof substantially fixed relative to the remaining structure despite variations in orientation of the assembled apparatus. Capacitor plate 55 is normally positioned at a very small distance from fixed plate 56, for this contributes to dynamic response and linearity improvement. This distance, its precise value controllable by adjustment of resistor 36, may be of the order of 0.001 inch, found sufficient to accommodate the closing angular deflection of the sensing member over the operating range of the apparatus in the described embodiment. Connections to the bobbin coil and to the sensing member 24 in the form of conventional coiled hairsprings may thus be retained without imposing a serious amount of restraint, but in some applications the upper and lower hairsprings are preferably replaced by gold galvanometer suspension ribbons 27 of like configuration, in order to minimize such restaint and to further improve the linearity characteristic.

It will be understood that various circuit components such as grid capacitor 60 (Fig. 4), VHF choke 61 (Fig.5) and plate capacitor 62 (Fig. 6), and others not shown or being hidden from view, are of course carried within the shielding enclosure at suitable positions and wired according to the particular circuitry desired, such as that next described, and in accordance with known VHF practice and techniques. Also, for coupling to the power source and indicating meter, connections are in this instance made through glass bead seals (not shown) in cupped base 44 to a conventional connector member 63 (Fig. 4) carried by a mounting cap 64.

In the detailed circuitry schematic shown in Figs. 7 to 11, the oscillators in Figs. 7 to 10 are each of modified Colpitts or ultra-audion type, the oscillator in Fig. 11 differing therefrom not only as to type but also as to loading, as will be described. In each instance, however, the oscillators are preferably designed to operate at VHF (say at 250 mc./s. as indicated earlier) in the interests of reducing overall size of the apparatus, and further to operate in a squegging or self-pulsing mode, as described, by using grid capacitor and grid resistor components having values much larger than usual in order to provide an abnormally large time-constant in the self-biasing grid circuit.

Referring now specifically to Fig. 7, tube 42 may be an acorn triode of type designated commercially as a 6F4. Such a tube is especially designed for use at very high frequencies, the tube having low interelectrode capacitances and low electron transit time because of the small size and close spacing of its electrodes. The internal plate-to-cathode capacitance $C_{pk}$ and grid-to-cathode capacitance $C_{gk}$ of interest in ultra-audion oscillators are here indicated as if separately inserted and, for ready recognition of the oscillator configuration, are shown as adjacent to tank coil 43, permissible because these interelectrode capacitances are quite small in microfarad value relative to grid capacitor 60 and plate capacitor 62 which afford VHF connection to tank coil 43. Grid return to the cathode is made through series connection resistors 65 and 66, the latter being shunted by a damping capacitor 67. Oscillator tube 42 is shunt fed by power source 16, a VHF choke 68 therefore being used in the lead between the tube plate and the positive terminal of source 16, and the plate-to-cathode D.C. circuit being completed via meter 20, series resistors 69 and 70, d'Arsonval movement 18, and another VHF choke 71. Although it has been found that even a connecting length of wire can serve to impose sufficient impedance and voltage isolation at the very high frequencies at which these oscillators operate, choke 71 is inserted in this instance to insure that maximum VHF isolation is imposed between the lower end of tank coil 43 and the tube cathode so that the oscillator will draw a minimum residual or no-load plate current. However, no such impedance is separately inserted in the radio-frequency loading circuit controlled by sensing member 24, for the said circuit includes the upper spring or other connecting means (not shown) leading to the d'Arsonval movement 18, also the sensing member 24 and the leads connecting tank coil 43 to the fixed and movable plates 55 and 56 of sensing capacitor 72, and this circuit presents suitable radio-frequency resistance and inductive reactance (separately shown in lumped form at 73 and 74) so that the capacitor 72 in series therewith effects variable radio-frequency loading of oscillator 14 in response to sensing member deflection under the influence of acceleration forces. While not essential in the particular embodiment here described, resistor 69 and its associated capacitor 75 effect low-pass filtering action for the metering circuit. Resistor 70 and its associated capacitor 76 provide further electrical filtering, smoothing and damping for the d'Arsonval movement. Source 34 and variable series resistor 36 shunt the circuit comprising meter 20 and d'Arsonval movement 18, serving to provide an adjustable bias current therethrough which, as indicated earlier, affects initial adjustment of sensing capacitor 72 and the relative limits of the positive and negative acceleration force ranges to which the apparatus can respond. The inherent sensitivity of the linear accelerometer may be adjusted to a desired value by means of the positionable ferrule 59 on sensing arm 24, such sensitivity being unaffected by supply voltage fluctutaions. As indicated earlier, ferrule 59 may also be positioned to provide an exactly balanced bobbin and sensing member assembly where operation as an angular accelerometer is desired.

Typical ranges of values of circuit components which have been found to provide satisfactory operation of the embodiment described with reference to Fig. 7 are as follows:

Supply source 16_____ 100 to 250 volts.
Supply source 34_____ 100 to 250 volts.
Variable resistor 36_____ 0.025 to 0.1 megohm
Resistor 65_____ 2 to 3 megohms.
Resistor 66_____ 2 to 3 megohms.
Resistor 69_____ 5000 to 10,000 ohms.
Resistor 70_____ 5000 to 10,000 ohms.
Capacitor 60_____ 25 to 50 mmf.
Capacitor 62_____ 500 to 1000 mmf.
Capacitor 67_____ 0.001 to 0.002 mfd.
Capacitor 75_____ 1 to 10 mfd.
Capacitor 76_____ 0.005 to 0.01 mfd.

It will be recognized that the circuit shown in Fig. 7 operates as an ultra-audion oscillator because the inherent plate-to-cathode and grid-to-cathode capacitances $C_{pk}$ and $C_{gk}$ provide a satisfactory condition of VHF voltage division for grid drive, and that to obtain optimum drive ratio for minimum residual plate current it may be necessary to increase one or the other of these capacitances to a slight extent by insertion of an additional small capacitor (not shown) effectively in parallel therewith. It has been found advantageous in some instances to provide the variable plate current controlling action by modifying the circuitry shown in Fig. 7 to the extent of utilizing sensing capacitor 72 at other points of the oscillator circuit than directly across tank coil 43. Typical instances are given in Figs. 8, 9 and 10, each operating as an ultra-audion oscillator in a self-pulsing mode as before.

In the circuit shown in Fig. 8, sensing capacitor 72 effectively parallels the grid-to-cathode capacitance $C_{gk}$, thus affecting both the VHF voltage division and the radio-frequency loading as a function of the acceleration force. The circuit shown in Fig. 9 is entirely the same except that sensing capacitor 72 effectively parallels plate-to-cathode capacitance $C_{pk}$.

In Fig. 10, sensing capacitor 72 is arranged in series connection between grid capacitor 60 and tank coil 43. In this instance sensing capacitor 72 is to be understood as designed to have rather larger capacity than in the previously described embodiments, such that the resultant grid-to-cathode capacitance in conjunction with the grid return resistance is of suitable value to effect the desired self-pulsing condition and to sensitively affect the self-pulsing rate and hence the average plate current as a function of acceleration force.

The force-measuring apparatus illustrated in Fig. 11 conforms to the basic squegging oscillator system shown in Figs. 2 and 3, but differs from the preceding embodiment shown in Figs. 7 to 10 as to the specific manner in which oscillator current is controlled by sensing arm 24. In this instance the oscillator is of tuned-plate tuned-grid type wherein feedback, between the tuned grid circuit comprising coil 77 and capacitor 78, and the tuned plate circuit comprising coil 79 and capacitor 80, is provided by means of the internal plate-to-grid capacitance $C_{pg}$, the radio-frequency circuit between plate and cathode being completed by capacitor 81. Additionally, however, coils 77 and 79 are here positioned in coupled relationship as is done in Hartley oscillator circuits, but note that in this embodiment it is of importance that the coils be wound in such relative directions or so connected as to produce degenerative action, opposing the oscillation-inducing effect of plate-to-grid capacitance $C_{pg}$, and proportioned to make the net feedback remain regenerative. The degenerative effect is modulated by sensing arm 24 which moves metal vane 28 between the two coils 77 and 79, as shown, to vary primarily the inductive coupling factor as a function of acceleration force. As in the preceding circuits, grid capacitor 60 and grid resistor 82 are proportioned to provide squegging action, rendering the apparatus extremely sensitive to changes in acceleration force experienced by the bobbin assembly.

It will be appreciated from the foregoing that the invention concerns a novel measuring and control apparatus greatly superior in many respects to otherwise similar types, providing a continuously-responsive force-measuring apparatus wherein the sensing member is constrained against movement except as to minute displacement under acceleration forces. It will also be appreciated from the foregoing that the force-measuring apparatus is compact, rugged and stable, insensitive to transverse accelerations, environmental changes, supply voltage variations and aging of circuit elements, yet extremely sensitive to acceleration force components extending along its sensitive axis, providing ample current or voltage output without additional amplification.

Various additions to, or modifications of, the above described apparatus will occur to those skilled in the art. For example, in the d'Arsonval movement which has been shown as a preferred force feedback means, the sensing member may be insulated from the bobbin coil, rather than connected to one end thereof, so that a separate and isolated connection to the movable capacitor plate can be made, enlarging the variety of oscillator circuitry which may then be employed. As another example, where still further sensitivity of the apparatus is desired, the loop gain in the force feedback system may of course be increased by modifying the illustrated circuitry to include a current amplifier, controlled by the oscillator plate-to-cathode current, or by a voltage corresponding thereto as developed across a resistor in the plate-to-cathode D.C. circuit, to deliver amplified oscillator current to the force feedback means, thus improving the overall transfer characteristic. Again, the force-measuring apparatus is of course not limited to operation at very high frequency, nor to use of any specific oscillator circuit, nor to a vacuum tube oscillator in general since, for example, it is now conventional practice to miniaturize airborne electronic equipment by employing transistorization techniques.

Obviously many other modifications, variations and applications of the invention are possible in the light of the above teachings. It is therefore to be understood that, within the scope of the appended claims, the invention may be practiced otherwise than as specifically described herein.

What is claimed is:

1. In combination, a self-pulsing oscillator having a circuit element which is variable to affect the self-pulsing characteristics and to thereby affect the magnitude of averaged oscillator current, force-sensitive means directly coupled to vary said circuit element in response to input force experienced by said force-sensitive means, electro-magnetic means coupled to said force-sensitive means and adapted to exert thereagainst a feedback force proportional to energizing current supplied to the electro-magnetic means, and circuit means connecting said oscillator and said electro-magnetic means and supplying to said electro-magnetic means an energizing current corresponding to the averaged oscillator current and in a direction to oppose said input force, said force-sensitive means thereby being constrained to small displacement substantially proportional to the input force, and said energizing current correspondingly varying linearly with and serving as a measure of said input force.

2. A combination as in claim 1, wherein said oscillator is self-pulsing by means of a grid-leak circuit having a large time-constant which effects repetitive interruption of oscillator action.

3. A combination as in claim 1, wherein said force-sensitive means comprises a pendulum mounted for angular displacement under the influence of an acceleration force.

4. A combination as in claim 3, wherein said circuit element comprises a variable capacitor having a fixed plate and a relatively movable plate, and wherein said movable plate is carried by said pendulum.

5. A combination as in claim 4, wherein said pendulum is made of an electrically conductive material and serves as connecting means for said movable plate of the capacitor.

6. A combination as in claim 1, wherein said circuit means includes a first source which supplies current to said oscillator through said electro-magnetic means, and means including a second source connected to provide a biasing current, to said electromagnetic means, opposite in sense to the current therethrough provided by said first source.

7. A combination as in claim 1, wherein said circuit means includes current-measuring means in series with said electro-magnetic means and a first source which supplies current to said oscillator through said electro-magnetic and current-measuring means, and means including a second source connected to provide a bias current which opposes said oscillator current in said electro-magnetic and current-measuring means.

8. In a measuring system, the combination comprising: means establishing a magnetic field, a coil member mounted in flux-linking relationship to said field and adapted for displacement from a normal position to vary said flux-linking relationship, a self-pulsing oscillator having an input circuit including said coil member and energized by direct current supplied to said input circuit, said oscillator including a circuit component coupled to said coil member for displacement therewith to affect the self-pulsing characteristics of said oscillator and thereby to correspondingly control the magnitude of said input current, and utilization means responsive to current changes in said coil member.

9. In a measuring system, the combination comprising: means establishing a magnetic field, a coil member mounted in flux-linking relationship to said field and adapted for displacement from a normal position to vary said flux-linking relationship, a self-pulsing oscillator having an input circuit including said coil member and energized by direct current supplied to said input circuit, said oscillator including a circuit component coupled to said coil member for displacement therewith to affect the self-pulsing characteristics of said oscillator and thereby to correspondingly control the magnitude of said input current, a biasing-current circuit adapted to provide an opposing current to said coil member, and utilization means responsive to current changes in said coil member.

10. In combination, a self-pulsing oscillator having associated therewith a vane member which is displaceable to affect the self-pulsing repetition rate and to thereby affect the magnitude of averaged oscillator unidirectional input current, a pivoted assembly including said vane member and adapted to produce displacement thereof in response to input torque arising from acceleration experienced by said pivoted assembly, electro-magnetic means including said pivoted asesmbly and adapted to exert thereagainst an opposing torque corresponding to the effective energizing current supplied to the electro-magnetic means, and circuit means connecting said oscillator and said electro-magnetic means and supplying to said electro-magnetic means an energizing current corresponding to the averaged oscillator unidirectional input current, said vane member thereby being constrained to minute displacement corresponding to said input torque, and said energizing current correspondingly varying with and serving as a measure of said input acceleration.

11. A combination as in claim 10, wherein said circuit means includes a first source which supplies current to said oscillator through said electro-magnetic means, and means including a second source connected to provide a biasing current, to said electro-magnetic means, opposite in sense to the current provided thereto by said first source.

12. A combination as in claim 10, wherein said self-pulsing oscillator includes a tank coil and resistance-capacitance network thereacross, and wherein said displaceable vane member varies the capacitance in said network to thereby affect the magnitude of said averaged oscillator unidirectional input current.

13. A combination as in claim 10, wherein said self-pulsing oscillator is of Colpitts type having a tank coil and serially connected capacitances thereacross, and wherein said displaceable vane member varies one of said capacitances.

14. A combination as in claim 10, wherein said oscillator includes a resistor-capacitor network in a circuit which effects repetitive interruption of radio-frequency oscillator action, and wherein said displaceable vane member varies a capacitor in said network.

15. A combination as in claim 10, wherein said oscillator includes first radio-frequency feedback means providing regenerative action and second radio-frequency means providing degenreative action, the net effect of said first and second radio-frequency feedback means being regenerative to maintain self-pulsing oscillator action, and wherein said displaceable vane member affects one of said radio-frequency feedback means to control the degree of said net effect and thereby the magnitude of said oscillator current.

16. A combination as in claim 10, wherein said oscillator includes a radio-frequency feedback circuit comprising a pair of coupled coils, the degree of coupling of said coils affecting the magnitude of said averaged oscillator unidirectional input current, and wherein said displaceable vane member extends between said coils to vary the degree of coupling thereof as a function of said input acceleration.

17. An electromagnetic device for use in a force-balancing force-feedback type of acceleration measuring apparatus, comprising in combination with a d'Arsonval type movement, which includes means establishing a magnetic field and a coil member pivotally mounted for angular displacement within said field and about a pivotal axis to vary the flux-linking relationship of said coil member and field, an elongated arm secured to said coil member and extending thereacross and transversely to said pivotal axis, a displacement-sensing capacitor having one plate thereof mounted upon one end of said arm and the confronting plate thereof fixed in position relative to said field establishing means, and a counterweight member positionably mounted at the other end of said arm, whereby said counterweight may be selectively positioned to render the pivotally mounted assembly of said coil member, said arm, said one plate and said counterweight member responsive to either linear or angular accelerations.

References Cited in the file of this patent

UNITED STATES PATENTS

| | | |
|---|---|---|
| 1,917,244 | Edwards et al. | Apr. 11, 1933 |
| 1,925,547 | Tuttle et al. | Sept. 5, 1933 |
| 2,154,260 | Brandenburger | Apr. 11, 1939 |
| 2,338,536 | Plant-Carcasson | Jan. 4, 1944 |
| 2,593,339 | Ostermann et al. | Apr. 15, 1952 |
| 2,697,594 | Stanton | Dec. 21, 1954 |
| 2,778,905 | Statham | Jan. 22, 1957 |